United States Patent [19]

Tsuchiya et al.

[11] Patent Number: 5,448,390
[45] Date of Patent: Sep. 5, 1995

[54] WAVELENGTH DIVISION MULTIPLEX BOTHWAY OPTICAL COMMUNICATION SYSTEM

[75] Inventors: Toshiyuki Tsuchiya; Ikutaro Kobayashi; Nobuyuki Tokura, all of Kanagawa, Japan

[73] Assignee: Nippon Telegraph and Telephone Corporation, Tokyo, Japan

[21] Appl. No.: 181,089

[22] Filed: Jan. 13, 1994

[30] Foreign Application Priority Data

Jan. 14, 1993 [JP] Japan .................. 5-005135

[51] Int. Cl.⁶ ........................... H04J 14/02
[52] U.S. Cl. .................. 359/132; 359/127; 359/152; 385/24
[58] Field of Search ........... 359/110, 132, 113–114, 359/124, 127, 143, 152, 153, 161, 162, 177, 179, 187; 385/24

[56] References Cited

U.S. PATENT DOCUMENTS 5,317,440  5/1994  Hsu ............................. 359/113
5,317,441  5/1994  Sidman ......................... 359/113

FOREIGN PATENT DOCUMENTS

0521514A2  7/1992  European Pat. Off. .
2222735    3/1990  United Kingdom ............... 359/113

OTHER PUBLICATIONS

"A Study of Optical Functional Integrated Circuit that Uses Silica-Based Waveguide Technique", Tsuchiya et al, IEICE Trans. Commun., vol. E75-B, No. 9, Sep. 1992, pp. 871–879.

IEEE 4th Workshop on Optical Local Networks, Sep. 24–25, 1992, pp. 63–69.

"Silica-Based Single-Mode Waveguides on Silicon and Their Application to Guided-Wave Optical interferometers", IEEE Journal of Lightwave Technology, vol. 6, No. 6, Jun. 1988, pp. 1003–1010.

*Primary Examiner*—David K. Moore
*Assistant Examiner*—Kinfe-Michael Negash
*Attorney, Agent, or Firm*—Nikaido, Marmelstein, Murray & Oram

[57] ABSTRACT

Bothway optical communication is carried out through a wavelength division multiplex system between two terminal stations (11a, 12a), each having a two-beam interference type filter (15) coupled with an optical cable (10) for multiplexing and/or de-multiplexing transmitted light and received light. The filter (15) has passbands and attenuation bands having periodic characteristics for the wavelength in the communication wavelength band. The wavelength of the transmitted light is essentially the same as the wavelength of the received light in each terminal station, with a small offset of the two wavelengths less than 5 nm. The oscillation wavelength of the laser (21) for transmission is adjusted so that it coincides with the passband of the filter, which doubles as a reference wavelength of the oscillation wavelength of the laser. Preferably, the two-beam interference type filter (15) is a Mach Zehnder type asymmetrical interferometer having a pair of directional couplers (F1, F2) connected to each other through a pair of optical fibers (f1, f2) so that the period of the passbands and/or the attenuation bands of the filter (15) is adjustable.

10 Claims, 12 Drawing Sheets

WAVELENGTH DIVISION MULTIPLEX BOTHWAY OPTICAL COMMUNICATION SYSTEM

FIELD OF THE INVENTION

The present invention relates to a bothway wavelength division multiplex optical communication system, in particular, relates to such a system in which wavelengths of light in two directions belong to a single wavelength band, although those wavelengths differ or offset from each other a little in the band, and the wavelengths are finely controlled based upon a single wavelength standard through a self tuning operation. The present invention is for instance used for subscriber lines in which large numbers of cables are necessary and therefore the use of a single optical cable for bothway communication is essential.

BACKGROUND OF THE INVENTION

Conventionally, a time compression multiplex (TCM) optical communication system has been used for a bothway communication system using a single optical line. In that system, an upward direction signal and a downward direction signal are forwarded to an optical cable alternatively, so that the system has been used for low rate communication up to 28 Mbits/second.

When high rate communication is requested in a system with a single optical cable, for instance, the high rate communication is higher than 50 Mbits/second, a wavelength division multiplex (WDM) optical communication system has been used. That system uses two wavelength bands, for instance 1.3 μm band and 1.5 μm band for an upward direction and a downward direction, respectively.

Figure 1A:
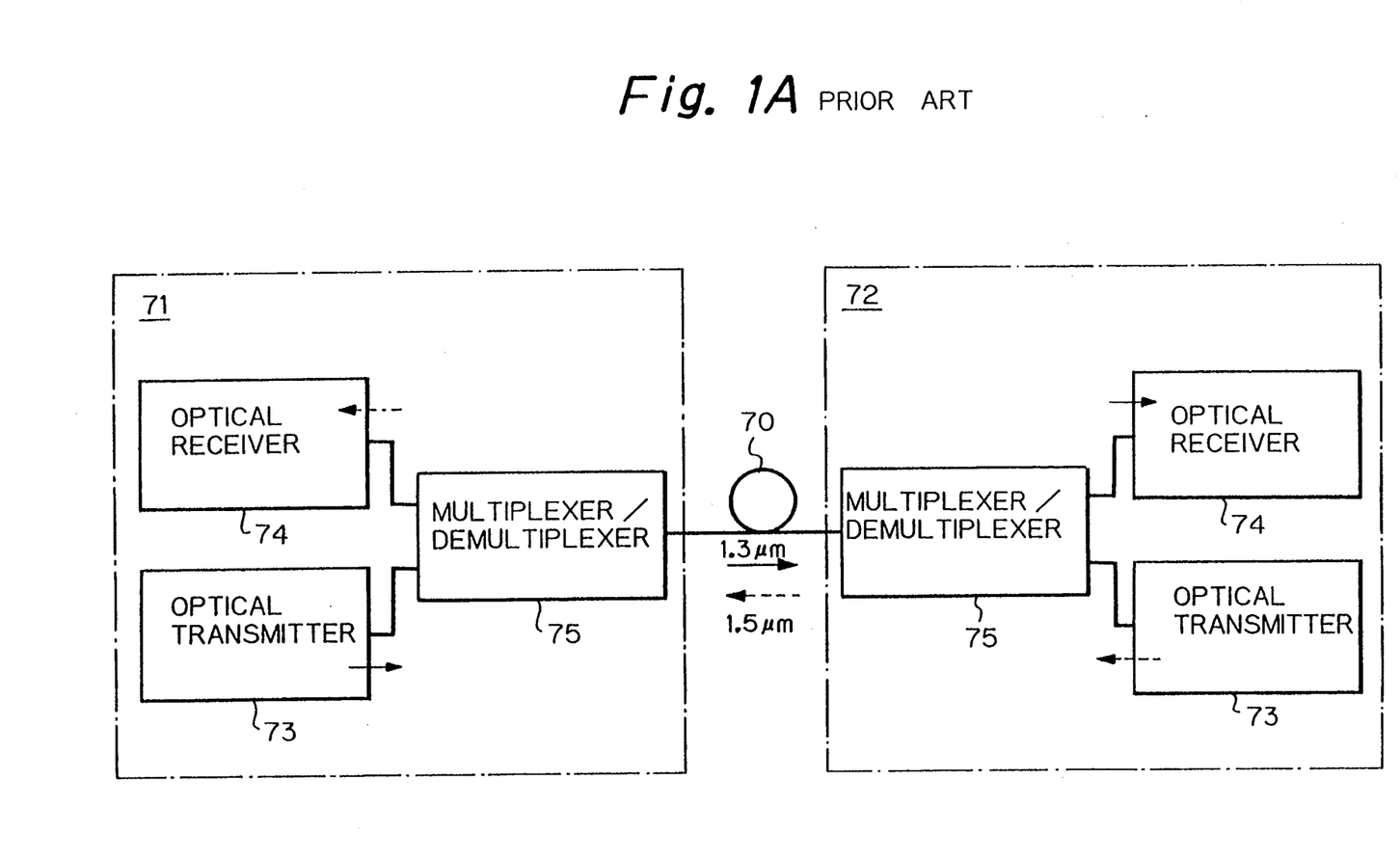
FIG. 1A shows a prior bothway optical communication system using two wavelengths.

FIG. 1A shows a block diagram of a prior bothway wavelength division multiplex (WDM) optical communication system. In the figure, the numeral 70 is a single optical fiber cable coupling a pair of terminal stations 71 and 72. Each terminal station has an optical transmitter 73 which outputs a light signal through a laser, an optical receiver 74 which receives an optical signal from an opposite side, and a multiplexer/demultiplexer 75 having an output port coupled with the single optical fiber cable 70 and a pair of input ports coupled with the transmitter 73 and the receiver 74 so that the light from the transmitter 73 is forwarded to the optical cable 70 and the light from the line 70 is forwarded to the receiver 74. The wavelength of the output of the transmitter 73 differs from that on the other side, for instance, the wavelength in one direction is 1.3 μm band, and the wavelength in the other direction is 1.5 μm band. Those wavelengths of 1.3 μm band and 1.5 μm band are multiplexed in the optical cable 70.

However, the system of FIG. 1A has the disadvantage that a laser in the transmitter 73 must provide an oscillation wavelength which coincides with a center of a passband of the multiplexer/demultiplexer. However, it should be noted that the oscillation wavelength of a laser depends upon ambient temperature, bias current and/or producing error, and therefore, it is rather difficult to obtain a laser with the requested accurate oscillation wavelength. Further, the difference between wavelengths in two directions must be large enough for suppressing cross talk between the two wavelengths, and therefore, two kinds of lasers through different producing processes must be used for a large oscillation wavelength difference, for instance, 1.3 μm and 1.5 μm. Therefore, producing yield rate of a laser is rather low, and so, the cost of the communication system of FIG. 1A is rather high.

Figure 1B:
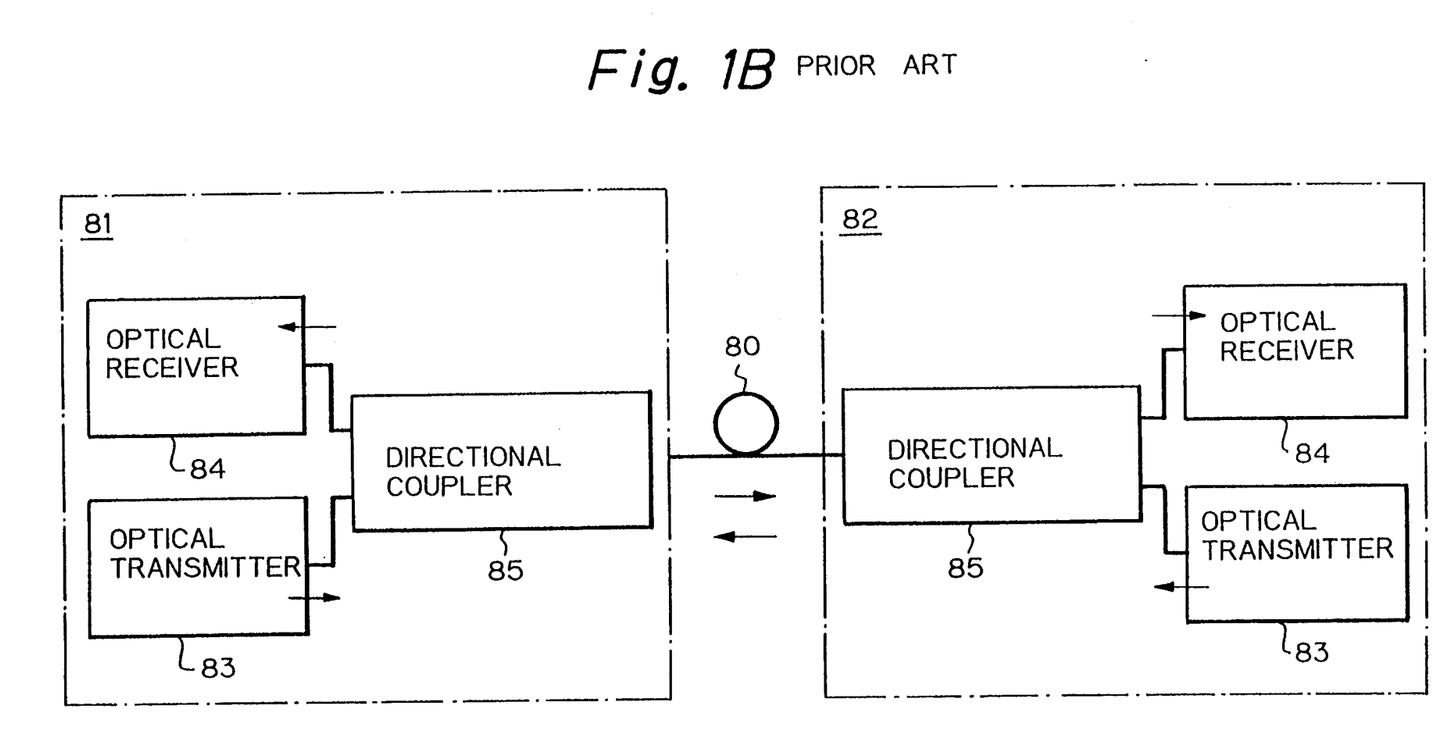
FIG. 1B shows another prior bothway optical communication system using a single wavelength.

FIG. 1B shows another prior bothway wavelength division multiplex optical communication system, which uses the common single wavelength band in both directions. The system of FIG. 1B has not existed in the market, but we considered it in our research. In the figure, the numeral 80 is an optical cable having a pair of ends each coupled with terminal stations 81 and 82. Each of the terminal stations has an optical transmitter 83, an optical receiver 84 for receiving light from the other side, and a directional coupler 85 coupled with an end of the optical cable 80, an output of the optical transmitter 83, and an input of the optical receiver 84, so that the light from the transmitter 83 is applied to the optical cable 80, and the light from the optical cable 80 is applied to the optical receiver 84.

However, the system is FIG. 1B has the disadvantage that the receiver 84 receives not only the light from the optical cable 80 but also the light from the transmitter 83 in the same terminal station through leakage in the directional coupler 85, and therefore, the signal characteristics are deteriorated, although the lasers in the transmitters in each stations oscillate with the same wavelength as each other.

SUMMARY OF THE INVENTION

It is an object, therefore, of the present invention to overcome the disadvantages and limitations of the prior bothway wavelength division multiplex optical communication system by providing a new and improved bothway wavelength multiplex optical communication system.

It is also an object of the present invention to provide a bothway wavelength division multiplex optical communication system which uses essentially a common wavelength band in both directions.

It is also an object of the present invention to provide a bothway wavelength division multiplex optical communication system in which a filter, for separating receiving wavelengths from transmitting wavelengths, doubles as a wavelength standard for a laser in a transmitter.

It is also an object of the present invention to provide a bothway wavelength division multiplex communication system in which two terminal stations have a master-slave relationship, and the filter for directional coupling in the master station provides 1) a wavelength standard for a laser in a transmitter in the master station, 2) a filter for directional coupling in the slave station, and 3) a laser for a transmitter in the slave station.

The above and other objects are attained by a wavelength division multiplex bothway optical communication system comprising a first terminal station, a second terminal station coupled with the first terminal station through an optical communication cable. Each terminal station comprising a transmitter having a laser for converting a transmission electrical signal to an optical signal, an optical receiver for receiving the optical signal which is subject to conversion to an electrical signal, and a two-beam interference type first filter having a zero phase input port and a pi phase input port coupled with an output of the laser and an input of the optical receiver, respectively, and a zero phase output port and a pi phase output port with one port being coupled with the optical communication line and the other port being free standing. The filter has periodical characteristics of passband and attenuation band for wavelengths in the communication wavelength band. Each terminal station has a wavelength control means for controlling the oscillation wavelength of the laser so that the oscillation wavelength coincides with a center of the passband of the filter. The wavelength control means comprises a monitor means for monitoring the wavelength of an output of the laser, a comparator for comparing a strength of the output of the monitor means with a predetermined threshold level to provide an output of comparison, and a control means for adjusting the oscillation wavelength of the laser based upon the output of the comparator so that the oscillation wavelength coincides with the passband of the filter. The wavelength band of the laser in the first terminal station is essentially the same as the wavelength of the laser in the second terminal station in the communication wavelength band. The optical communication cable is coupled with the zero phase output port of one terminal station and the pi phase output port of the other terminal station.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Some of the important features of the present invention are the use of a two-beam interference type filter as a multiplexer/de-multiplexer in a wavelength division multiplex communication system, and the two-beam interference type filter doubles as a wavelength standard for determining an oscillation wavelength of a laser in a transmitter.

First, a two-beam interference type filter is described in accordance with FIGS. 2A–2D.

Figure 2A:
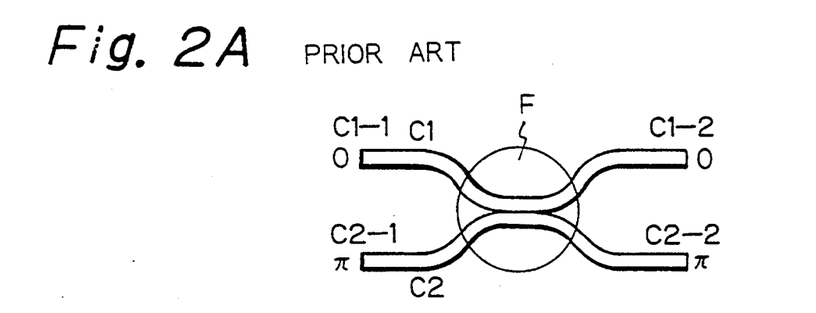
FIGS. 2A–2D show explanatory figures of a two-beam interference type filter.

FIG. 2A shows the structure of a two-beam interference type directional coupler, having a pair of optical fibers C1 and C2 which are optically coupled with each other in the region F in a predetermined length so that the optical fibers C1 and C2 have a common clad layer in the region F. The coupler has a pair of input ports C1-1 and C2-1, and a pair of output ports C1-2 and C2-2. As the directional coupler is reversible, the input ports and the output ports may be reversed. Each of the input ports and each of the output ports are called a zero phase port and a pi phase port.

In operation of the directional coupler, when input light is applied to one of the input ports, the input light is divided to the two output ports so that each output port outputs optical power having the level of -3B as compared with the input optical power. Therefore, the directional coupler of FIG. 2A is called a 3 dB coupler.

When the coupling region F is designed properly, the ratio of the output optical power to each output port depends upon the wavelength of the input light. Therefore, it functions as a wavelength filter.

When it operates as a wavelength filter, assuming that the input light is applied to the zero phase port C1-1, it is switched to the output port C1-2 or the output port C2-2, depending upon the wavelength of the input light. Similarly, input light to the pi phase port C2-1 is switched to the output port C1-2 and the output port C2-2, depending upon the wavelength of the input light.

Figure 2B:
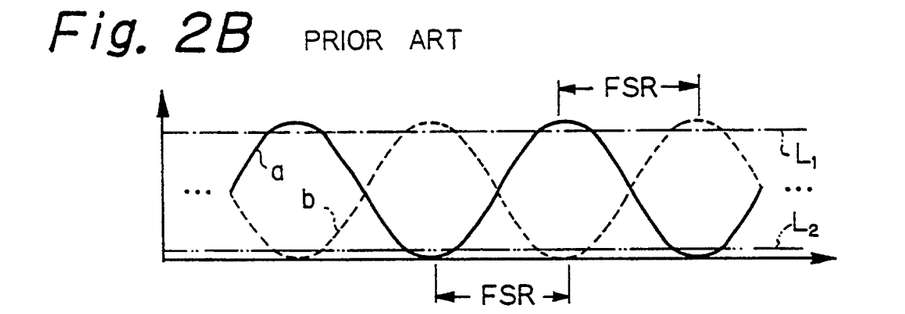

The transmission factor, and/or the attenuation factor of the filter has periodic characteristics as shown in FIG. 2B, where the horizontal axis shows the wavelength of the input light, and the vertical axis shows the strength of the output light when the input light is applied to the zero phase input port C1-1. The solid curve (a) shows the output at the zero phase output port C1-2, and the dotted curve (b) shows the output at the pi phase output port C2-2.

Threshold level $L_1$ and/or $L_2$ is defined for self tuning purposes of a laser as described later. The higher threshold level $L_1$ is the same as the peak output of the filter, or a little lower than the peak output. The lower threshold $L_2$ is almost zero or a little higher than zero.

Figure 2C:
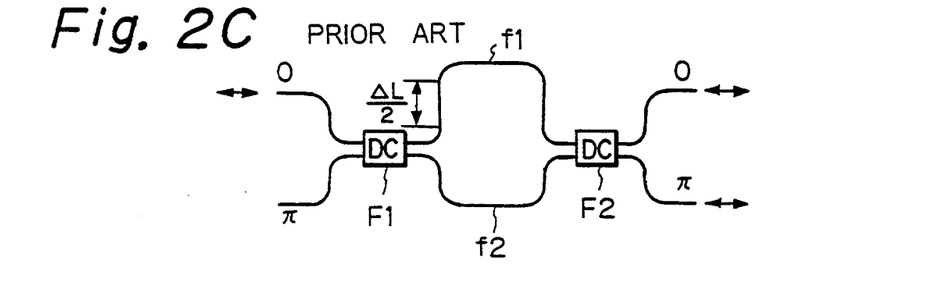

In practical use, a pair of directional couplers F1 and F2 of FIG. 2A are coupled through a pair of optical fibers f1 and f2 as shown in FIG. 2C. The symbol F1 and F2 shows a directional coupler in FIG. 2A. The zero phase port of the first directional coupler F1 is coupled with the zero phase port of the second directional coupler F2 through the optical fiber f1, and the pi phase port of the first directional coupler F1 is coupled with the pi phase port of the second directional coupler F2 through the optical fiber f2. The optical length of the fibers or the optical wave-guides f1 and f2 differs by ΔL. We call the structure of FIG. 2C an asymmetrical Mach Zehnder type filter, or an asymmetrical Mach Zehnder type interferometer.

The advantage of the structure of FIG. 2C is that the period (=2×FSR; Free Spectrum range) between the wavelength for the peak of the passband and the peak of the attenuation band may be adjusted by adjusting the difference ΔL of the length of the fibers f1 and f2.

The frequency band ΔF from the frequency for the peak output to the frequency for the minimum output of the filter in FIG. 2C is shown below.

$$\Delta F = c/(2 \times n_{eff} \times \Delta L)$$

where c is light velocity, $n_{eff}$ is the effective refractive index of a waveguide or a fiber, and ΔL is the difference between the lengths of optical fibers f1 and f2 coupling directional couplers F1 and F2. A Mach Zehnder type filter having ΔF up to 640 GHz is possible to produce.

Figure 2D:
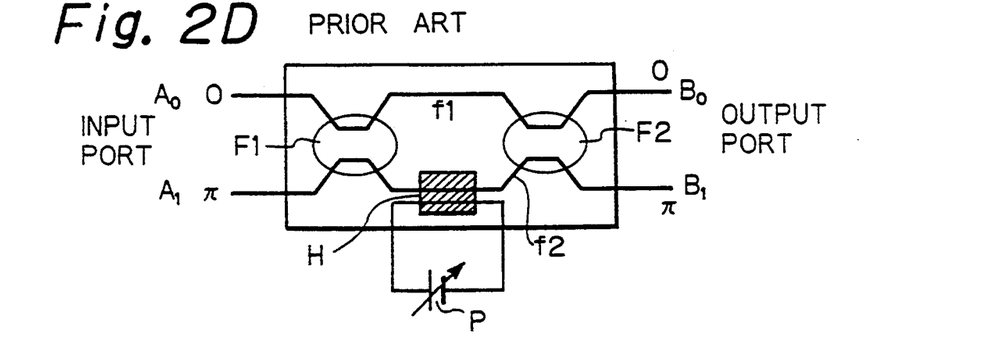

FIG. 2D shows the modification of an asymmetrical Mach Zehnder type filter, which has a heater H on one of the intermediate optical fibers f1 and f2. The heater H is heated by the power source P. The structure of FIG. 2D has the advantage that the period (FSR or ΔF) or the tuning wavelength is controlled finely by controlling the temperature of the heater H. The value FSR is increased around 0.5-1.0 nm for each degree of temperature when the temperature is increased. That is described in The Institute of Electronics, Information and Communication Engineer in Japan, Trans. Commun., vol. E75-B, No.9, September 1992, pages 871–879.

A Mach Zehnder type filter may be produced on a quartz waveguide. When the period FSR is wide, the size of the filter is small, the producing error is small, and the transmission characteristics of the filter may be uniform.

A port of the filter may have a spherical tapered end so that it is well coupled with an optical fiber optically.

The two-beam interference type directional coupler or a filter of FIGS. 2A through 2D is described in Journal of Lightwave Technology, vol 6, No. 6, June 1988, pages 1003-1010.

Figure 3:
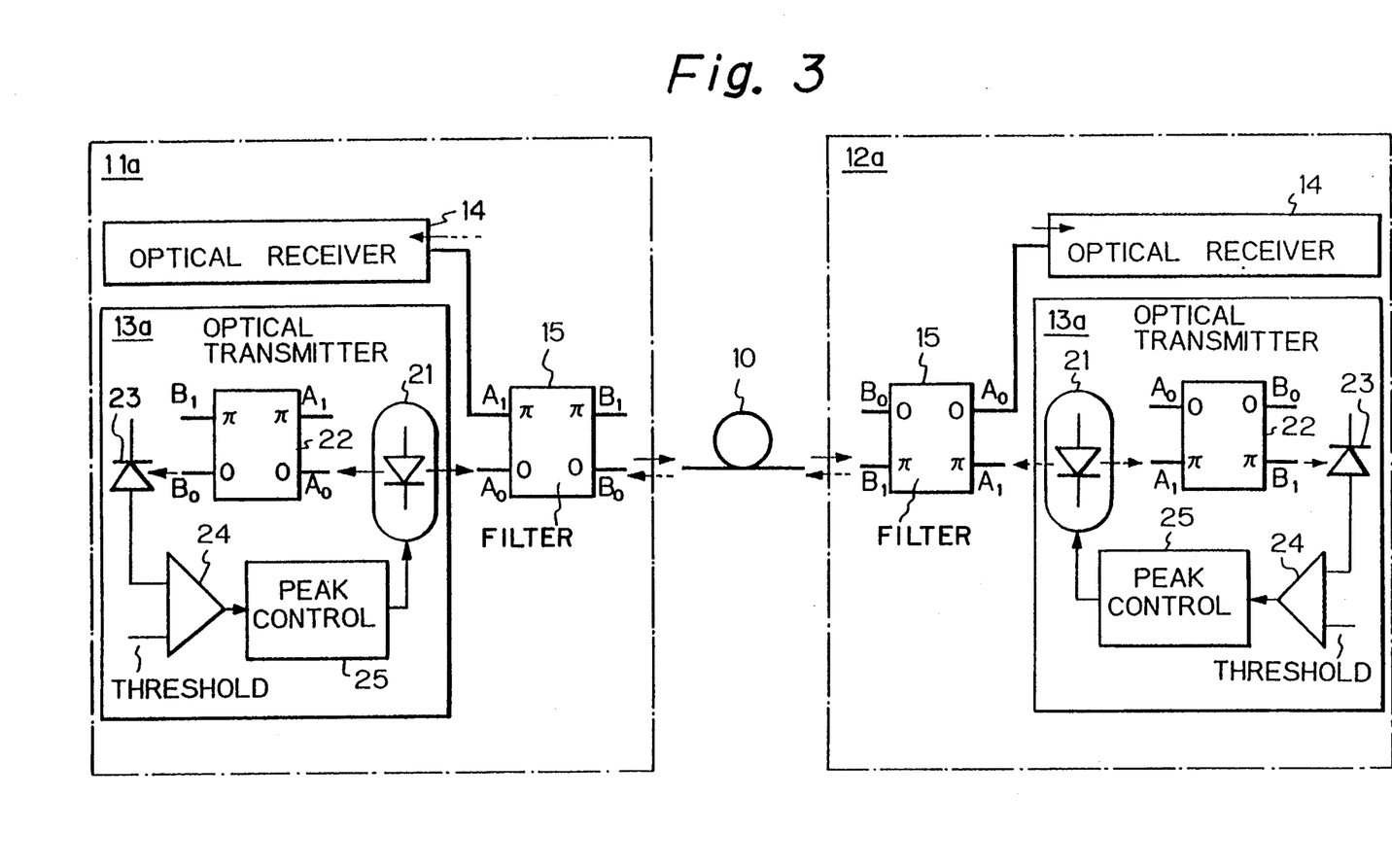
FIG. 3 is a block diagram of an embodiment of the bothway wavelength division multiplex optical communication system according to the present invention.

FIG. 3 shows a block diagram of an embodiment of a wavelength division multiplex bothway optical communication system according to the present invention. In the figure, a pair of terminal stations 11a and 12a are coupled through an optical cable 10. Each of the terminal stations 11a and 12a has an optical transmitter 13a, an optical receiver 14, and a filter 15 which operates to multiplex/de-multiplex transmitted light and received light.

The filter 15 is a two-beams interference type filter of FIG. 2A, or an asymmetrical Mach Zehnder type interferometer as shown in FIG. 2C and FIG. 2D. In case of FIG. 2C or FIG. 2D, the period of the passbands of the filter is adjustable.

The filter 15 has the transmission characteristics as shown in FIG. 2B, where the solid line shows the transmission characteristics when the input light is applied to the zero phase input port, and the output light is at the zero phase output port. The dotted line shows the transmission characteristics when the input light is applied to the pi phase port, and the output light is at the zero phase output port. The dotted line is the same as the transmission characteristics at the pi phase output port when the input light is applied to the zero phase input port.

The filter 15 is reversible. Therefore, input ports and output ports may be reversed. However, we refer to input ports and output ports for the sake of simplicity of explanation.

It is assumed that the input ports have zero phase port $A_0$ and pi phase port $A_1$, and the output ports have zero phase port $B_0$ and pi phase port $B_1$.

The optical cable 10 is coupled with the outputs of the filters 15 so that the transmission characteristics of the output port of the first terminal station differs from that of the second terminal station. In the embodiment, the cable 10 is coupled with the port $B_0$ (zero phase) in the station 11a, and the port $B_1$ (pi phase) in the station 12a.

The optical receiver 14 is coupled with the filter 15 in the port which has the same transmission characteristics as that of the output port at the opposite station. In the embodiment, the optical receiver 14 in the station 11a is coupled with the input port $A_1$ (pi phase), (the output port of the opposite station 12a is $B_1$ (pi phase), and the optical receiver 14 in the station 12a is coupled with the input port $A_0$ (zero phase), where the output port of the opposite station 11a is $B_0$ (zero phase).

The optical transmitter 13a is coupled with the filter 15 at the input port having the same transmission characteristics as the output port which is coupled with the optical cable 10. In the embodiment, the optical transmitter 13a in the station 11a is coupled with the input port $A_0$, (zero phase), where the optical cable 10 is coupled with the output port $B_0$, (zero phase), and the optical transmitter 13a in the station 12a is coupled with the input port $A_1$ (pi phase) where the optical cable 10 is coupled with the output port $B_1$ (pi phase).

The light from the transmitter 13a in the station 11a is forwarded, through the port $A_0$ (zero phase) of the filter 15 in the station 11a, the output port $B_0$, of the filter 15, the optical cable 10, the output port $B_1$ (pi phase) of the filter 15 in the station 12a, and the input port $A_0$ (zero phase) of the filter 15 in the station 12a, to the optical receiver 14 in the station 12a. Similarly, the light from the transmitter 13a in the station 12a is forwarded, through the port $A_1$ (pi phase) of the filter 15 of the station 12a, the port $B_1$ (pi phase) of the filter 15 in the station 12a, the optical cable 10, the port $B_0$ of the filter 15 in the station 11a, and the port $A_1$ in the filter 15 in the station 11a, to the optical receiver 14 in the station 11a.

Therefore, it should be noted that the ports of the filter are used in an opposite manner (opposite phase) in the corresponding means in each station.

It should be appreciated that the wavelength band from the first station 11a is in the same wavelength band as that from the second station 12a. It is for instance 1.3 μm band, or 1.5 μm band. The wavelength from the first station 11a differs a little from the wavelength from the second station 12a in the same wavelength band. The difference or offset between the two wavelengths is for instance less than 5 nm. Thus, two wavelengths are multiplexed in an optical cable 10, and bothway communication is carried out by using a single optical cable.

Next, the self tuning of a laser so that the oscillation wavelength of a laser 21 coincides with a center of a passband of a filter 15 is described. In the embodiment, a second filter 22 for self tuning purposes is provided in each station 11a and 12a for defining a reference wavelength. The second filter 22 is also a two-beam interference type filter, or asymmetrical Mach Zehnder type interferometer, having the same passband characteristics as that of the first filter 15. The second filter 22 has input ports $A_0$ (zero phase) and $A_1$ (pi phase), and output ports $B_0$ (zero phase) and $B_1$, (pi phase).

A semiconductor laser provides front light and back light in opposite directions. Front light is used for transmitting a signal to another station, and back light is used for self tuning of the wavelength of the laser.

Back light of the laser 21 is applied to one of the input ports of the tuning filter 22, which provides output light to an optical-electrical converter or sensor 23 through an output port having the same transmission characteristics as that of the output port of the filter 15. In the embodiment of FIG. 3, back light of the laser 21 in the station 11a is applied to the port $A_0$ (zero phase) of the filter 22, and the output of the port $B_0$ (zero phase) is applied to the converter 23. Similarly, back light in the station 12a is applied to the port $A_1$ (pi phase) of the filter 22, and the output of the port $B_1$ (pi phase) is applied to the converter 23.

The output of the converter 23 is applied to the comparator 24, which compares the output of the converter 23 with a predetermined threshold level $L_1$ (FIG. 2B), which is close to the maximum level of the transmission power but a little lower than the same. The comparator 24 provides positive output only when the output of the converter 23 exceeds the threshold level. The peak control 25 receives the output of the comparator 24, and controls the oscillation wavelength of the laser 21 so that output of the reference filter 22 is the maximum. The manner for adjusting the oscillation wavelength of a laser is conventional, and it is possible by adjusting the temperature of a laser, and/or bias current of a laser.

Two terminal stations 11a and 12a have the above closed feedback loop for controlling oscillation wavelength. The station 11a receives back light of the laser 21 at the zero phase input port $A_0$ of the filter 22 which outputs the light at the zero phase output port $B_0$ and the peak control 25 controls so that the oscillation wavelength of the laser 21 coincides with the passband of the filter 22, so that the output of the filter 22 is the maximum. Thus, the oscillation wavelength of the laser 21 is controlled so that it coincides with the wavelength which provides the peak or the maximum transmission of the filter 22 for zero phase.

Similarly, the oscillation wavelength of the laser 21 in the station 12a is controlled so that it coincides with the wavelength which provides the peak or the maximum transmission of the filter 22 for pi phase.

Therefore, the wavelength band of two stations is in the same wavelength band, and the wavelength of a first station is offset or shifted by the pi phase from that of a second station.

The combination of the reference filter 22, the sensor 23, the comparator 24, and the control 25 constitute a monitor means for monitoring and controlling the oscillation wavelength of the laser 21.

The two-beam interference type filter 15 has the features that the insertion loss is small, and the leakage of the transmitted light to an optical receiver is small.

The filter 15 has the periodical characteristics as shown in FIG. 2B. Therefore, it is only necessary to coincide the oscillation wavelength of a laser with one of the transmission wavelengths of the filter.

Further, it is easy and simple in the present invention to coincide the transmission wavelength of a filter in a received side with that of a transmitted side.

Further, the requested value of the adjustment of the oscillation wavelength of a laser is small, and the use of a pair of lasers having the oscillation wavelength in the same band is possible in both the end terminals. It should be noted that a laser in a prior art of FIG. 1A must be adjusted in wide range so that the oscillation wavelength coincides with the passband of a filter, and further, lasers of different oscillation wavelengths are requested in two terminal stations.

In one modification, a peak control 25 may operate so that the output of the optical-electrical converter 23 becomes the maximum so that transmission optical power into the cable 10 is the maximum, although the embodiment of FIG. 3 has the comparator 24 to compare the output of the converter 23 with the predetermined threshold.

In another modification, a two-beams interference type filter may be substituted with another filter which has periodical and complementary characteristics shown in FIG. 2B, for instance, a ring resonator, and a Fabry-Perot Etalon filter, although the former has too high Q, which would cause the operation to be unstable, and is difficult to have a long period, and the latter is difficult to adjust an optical coupling axis, which cannot unify the periodical characteristics between each filter.

Figure 4A:
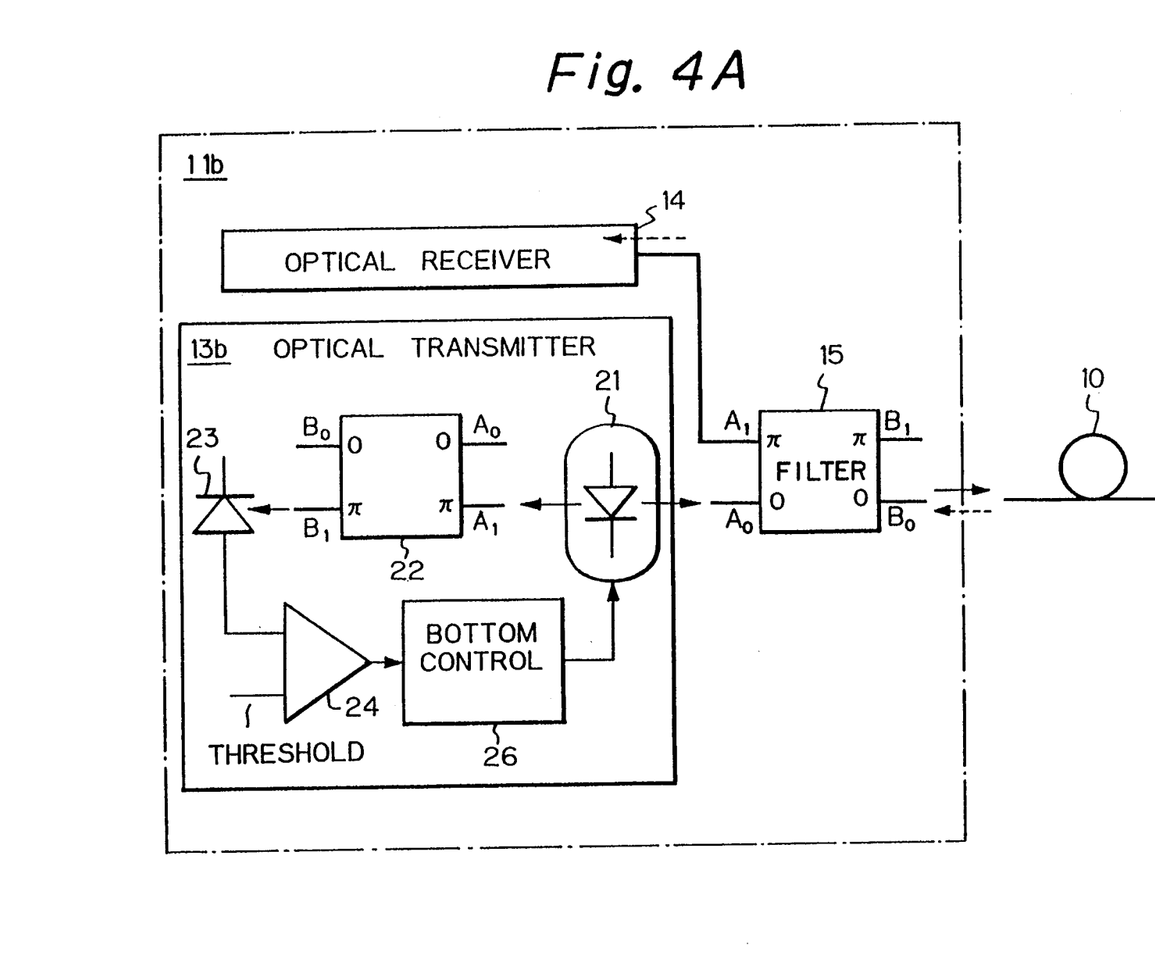
FIG. 4A is a block diagram of another embodiment of the bothway wavelength division multiplex optical communication system according to the present invention.
Figure 4B:
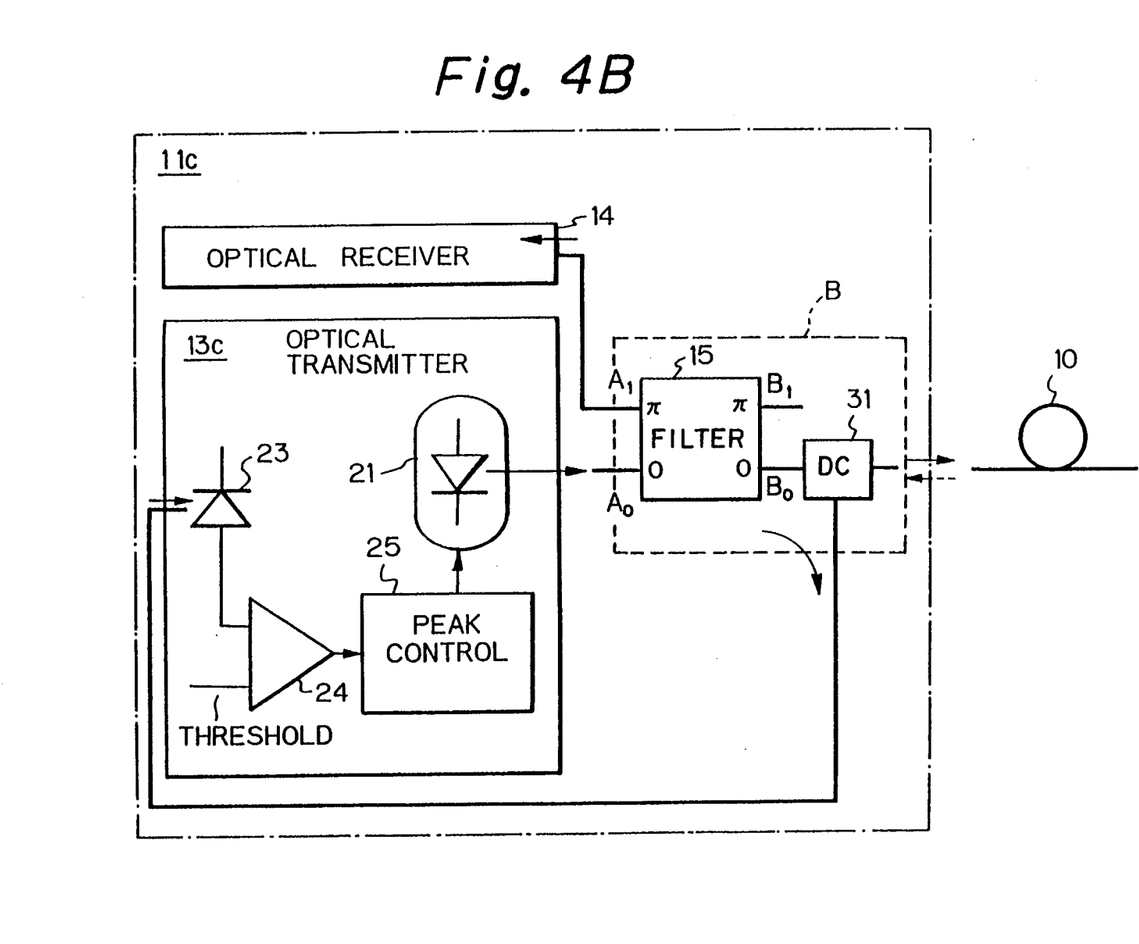
FIG. 4B is a block diagram of still another embodiment of the bothway wavelength division multiplex optical communication system according to the present invention.
Figure 4C:
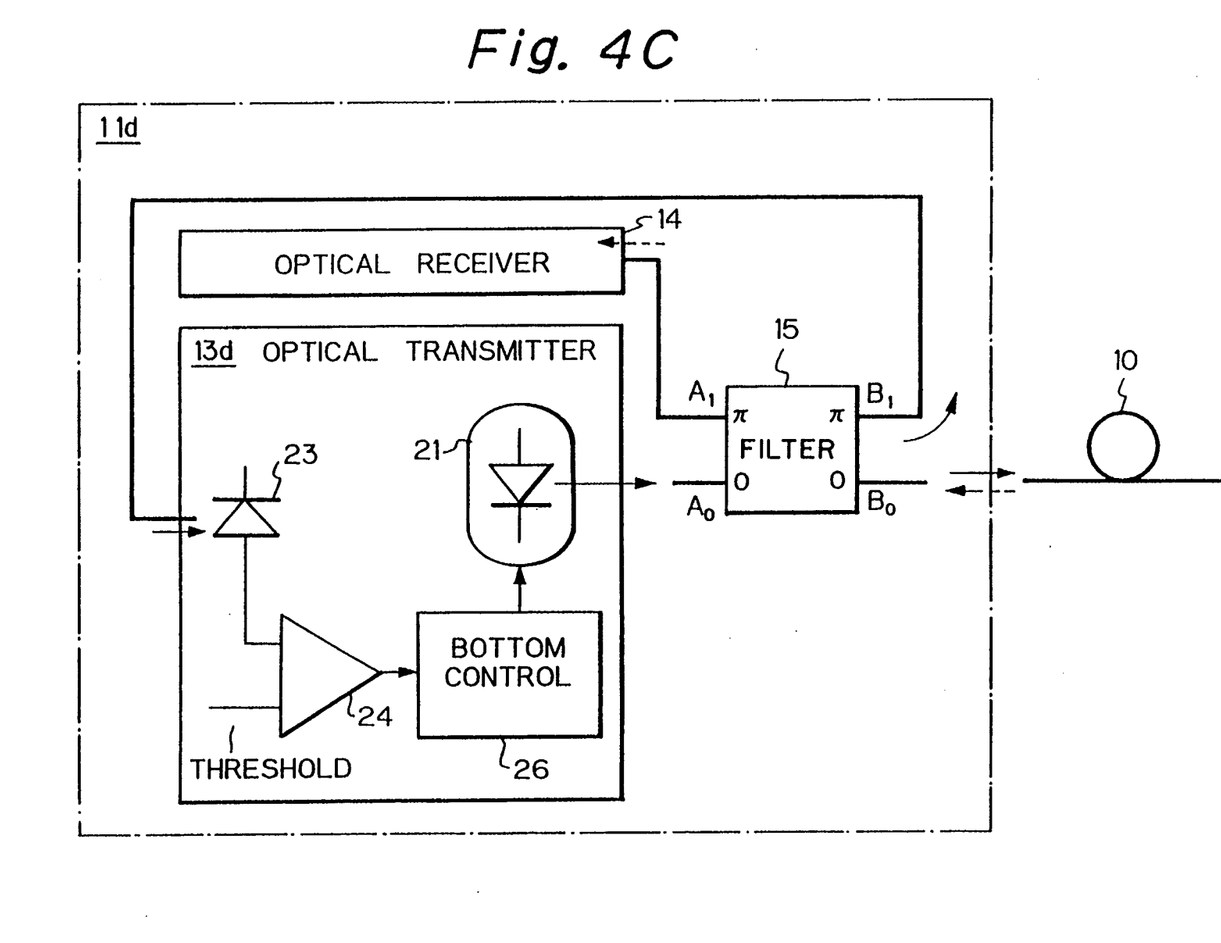
FIG. 4C is a block diagram of still another embodiment of the bothway wavelength division multiplex optical communication system according to the present invention.

FIGS. 4A, 4B and 4C show modifications of the embodiment of FIG. 3 of the present invention. The features of those modifications reside in the structure for controlling the oscillation wavelength of a laser to coincide with the passband of a filter 15. In those modifications, only one end terminal is shown for the sake of simplicity.

In FIG. 4A, the terminal station 11b has an optical transmitter 13b, an optical receiver 14, and a filter 15 which is optically coupled with an optical cable 10. The optical transmitter 13b has a laser 21 for oscillating transmission light, a reference wavelength filter 22, an optical-electrical converter 23, a comparator 24, and a bottom control 26. The feature of FIG. 4A as compared with the embodiment of FIG. 3 is that the reference wavelength filter 22 receives back light of the laser 21 on the pi phase port $A_1$ when front light of the laser is applied to the zero phase port $A_0$ of the filter 15. That is to say, back light of the laser is received by the reference wavelength filter 22 on the port which is in a different phase from that of the receiving port of the filter 15.

The comparator 24 in this case compares the output of the converter 23 with the threshold which is close to the bottom value $L_2$ in the output of the filter (see FIG. 2B). The bottom control 26 controls the oscillation wavelength of the laser 21 so that the output of the reference filter 22 is less than the threshold $L_2$. Thus, the oscillation wavelength of the laser 21 coincides with the passband and of the filter 22.

FIG. 4B shows a block diagram of another modification of the embodiment of FIG. 3. The feature of FIG. 4B is that the terminal station 11c has no reference wavelength filter, but an asymmetrical branch ratio type directional coupler 31 is provided between an output of a filter 15 and an optical cable 10, so that a small part of transmission optical power is branched to be applied to an optical-electrical converter or a sensor 23. A control 25 in this case is a peak control which controls a laser so that output power of the sensor 23 is higher than a predetermined threshold $L_1$. The filter 15 operates not only for multiplexing and/or de-multiplexing transmitted light and received light, but doubles as a wavelength reference filter.

It should be noted that the filter 15 and the directional coupler 31 are integrated on the common substrate B, by using a quartz waveguide.

FIG. 4C shows a block diagram of still another modification of the embodiment of FIG. 3. The feature of FIG. 4C is that the terminal station 11d has no reference wavelength filter, but the optical-electrical converter 23 receives the light from the free standing output port $B_1$ of the filter 15 for the purpose of controlling the oscillation wavelength of the laser 21. The control 26 in this case is a bottom control which controls the output of the sensor 23 to be the bottom $L_2$ or the minimum.

Figure 5A:
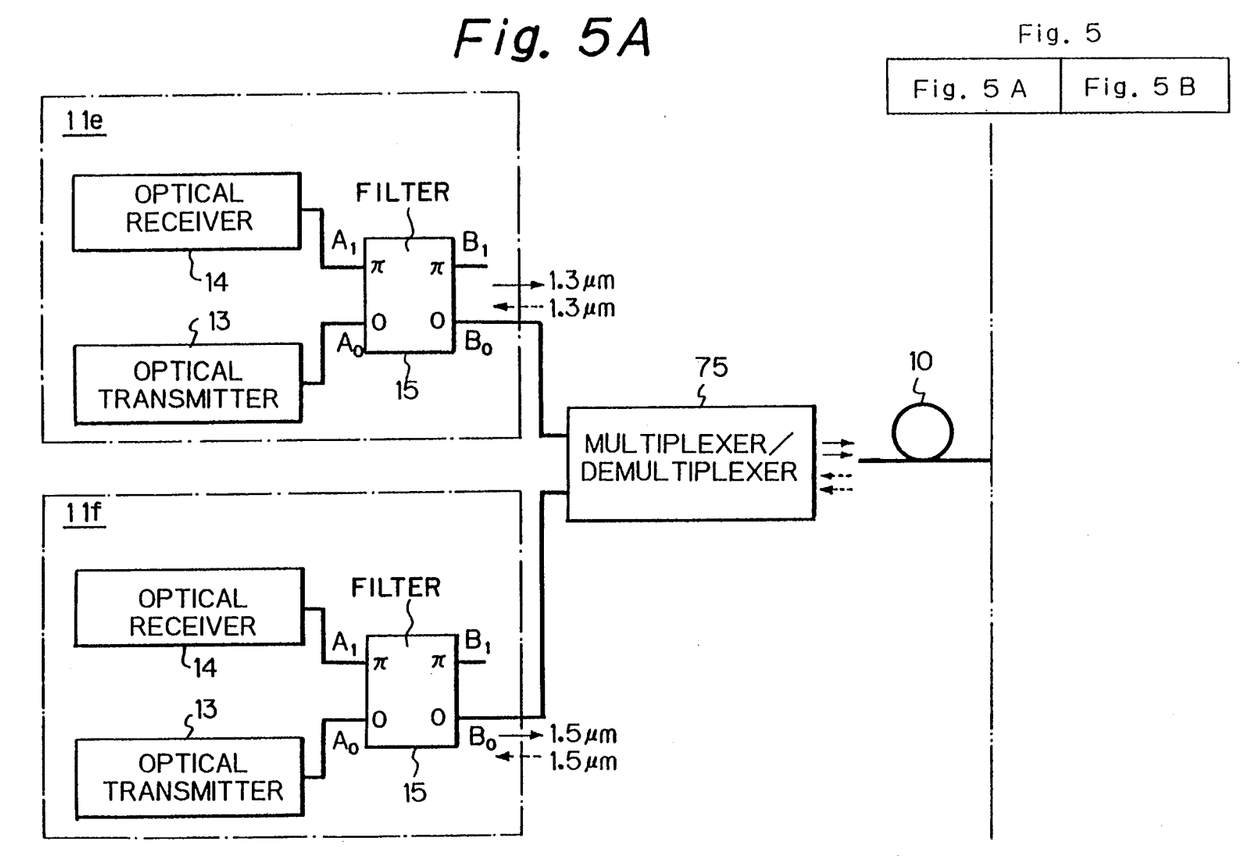
FIGS. 5A and 5B are a block diagram of still another embodiment of the bothway wavelength division multiplex optical communication system according to the present invention.
Figure 5B:
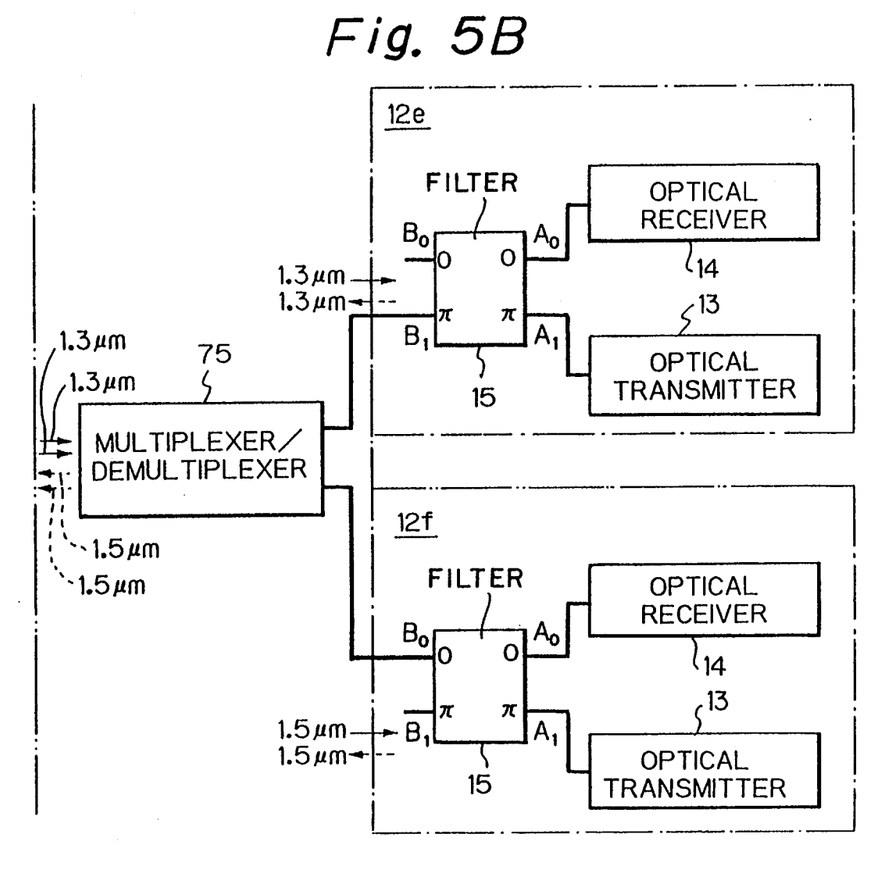

FIGS. 5A-5B show a block diagram of wavelength division multiplex bothway optical communication system according to the present invention. The embodiment of FIGS. 5A-5B is the combination of the present wavelength division multiplex system of FIGS. 3 through 4C, and the prior art of FIG. 1B, and may communicate by using four wavelengths.

In FIGS. 5A-5B, the terminal stations 11e, 11f, 12e and 12f are a terminal station of FIG. 3, FIG. 4A, FIG. 4B or FIG. 4C. The terminal stations 11e in one terminal and the terminal station 12e in the other terminal operate for instance in 1.3 μm band, and the terminal stations 11f and 12f operate for instance in 1.5 μm. The wavelengths of 1.3 μm band and 1.5 μm band are multiplexed or de-multiplexed in the multiplexer/demultiplexer 75. Therefore, four wavelengths (two wavelengths in 1.3 μm band, and two wavelengths in 1.5 μm band) are multiplexed in the optical cable 10.

Figure 6A:
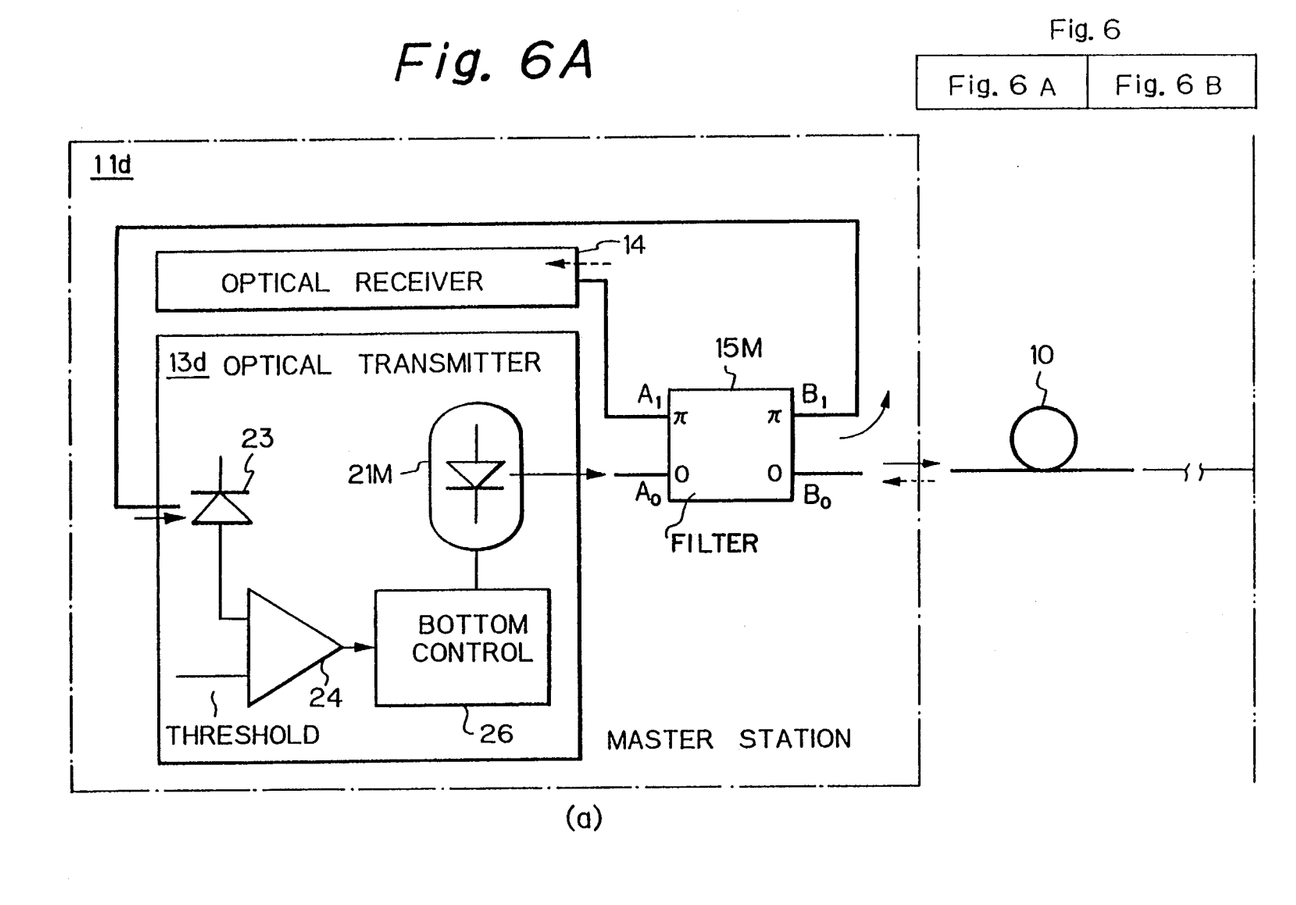
FIGS. 6A and 6B are a block diagram of still another embodiment of the bothway wavelength division multiplex optical communication system according to the present invention.
Figure 6B:
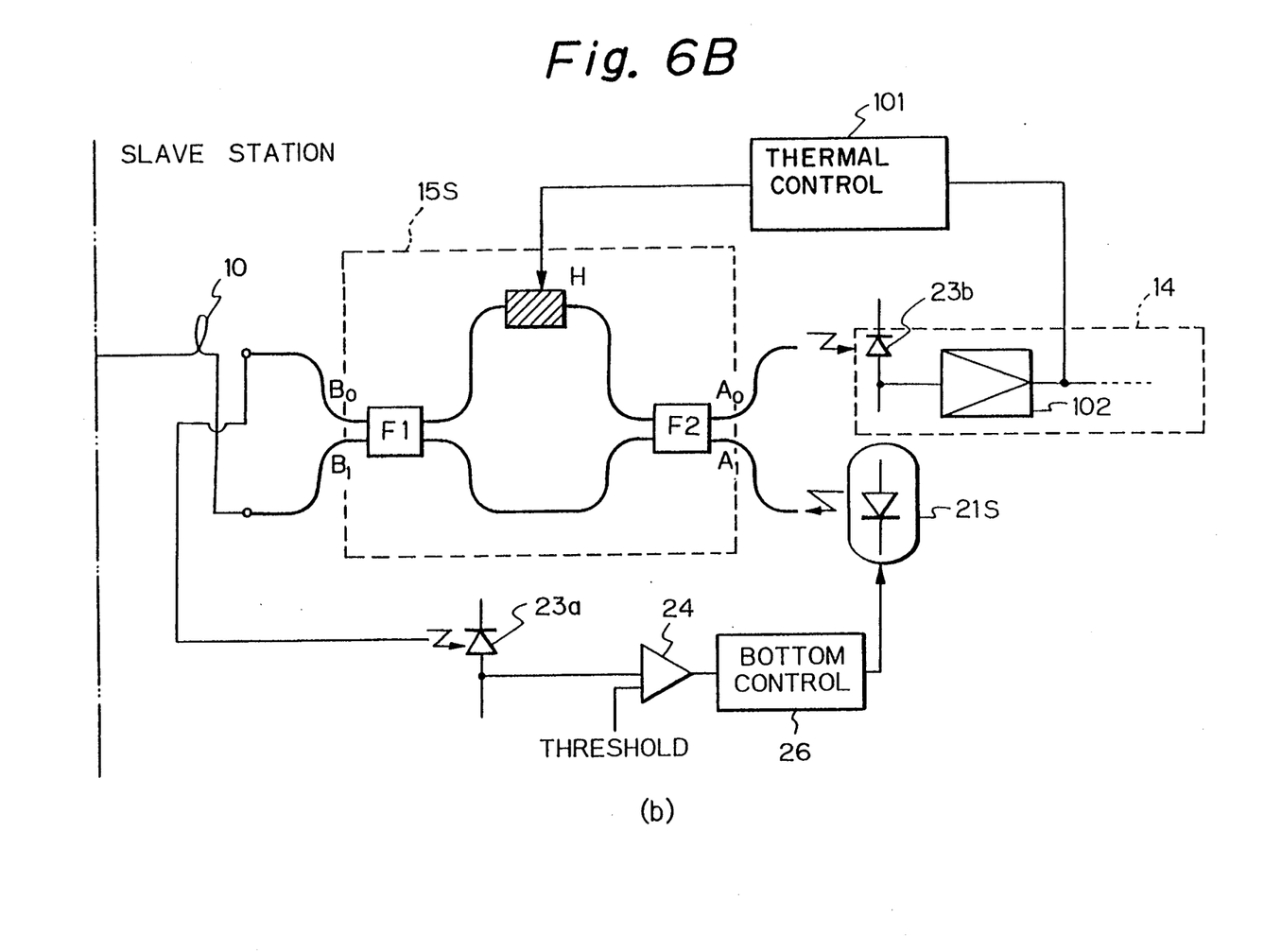

FIGS. 6A-6B show a block diagram of the optical communication system, according to the present invention, which functions to coincide the wavelength of a laser and a filter in both the end stations. In FIGS. 6A-6B, one of the end stations operates as a master station, and the other end station operates as a slave station which follows the master station in wavelength of a laser and a filter. In FIGS. 6A-6B, the station (a) operates as a master station, and the station (b) operates as a slave station.

The master station (a) in FIG. 6A has the structure of FIG. 4C. However, it should be appreciated of course that another structure, for instance, FIG. 3, FIG. 4A or FIG. 4B may be possible.

The basic idea for coinciding the wavelength of a laser and a filter in both the end stations is as follows:

a) A filter for multiplexing/demultiplexing transmitted light and received light in a master station operates to provide a reference wavelength.

b) The oscillation wavelength of a laser for providing transmitted light in a master station is controlled so that is coincides with the passband of the filter in the master station.

c) The filter for multiplexing/demultiplexing transmitted light and received light in a slave station is then controlled so that the passband of the filter in the slave station receives the maximum level of light from the master station.

d) The oscillation wavelength of a laser for providing transmitted light in the slave station is then controlled so that it coincides with the passband of the filter in the slave station.

Therefore, it should be appreciated that the passband of the filter in both stations coincide with each other, and the oscillation wavelength of the lasers in both stations coincides with the passband.

In FIGS. 6A-6B, the master station 11d has a filter 15M, which functions as the reference of the wavelength in communication system. The oscillation wavelength of a laser 21M for providing transmitted light in the master station 11d is then controlled so that it coincides with the passband of the filter 15M in the master station 11d, as described in accordance with FIG. 4C.

In a slave station, optical light applied to the slave station (FIG. 6B) from the optical cable 10 is applied to an optical-electrical converter 23b through the filter 15S. The electrical signal of the output of the converter 23b is then applied to an optical receiver 14 which has a linear amplifier 102 functioning as an AGC (automatic gain control). The output of the amplifier 102 provides the received signal of the optical communication system. The output of the amplifier 102 is also applied to a thermal control circuit 101 which supplies a heater H in the filter 15S power so that the passband of the filter 15S is shifted according to the power thus applied so that the output of the amplifier 102 has the maximum level. Thus, the center of the passband of the filter 15S, which has a pair of directional couplers F1 and F2 coupled with each other through a pair of asymmetrical optical fibers one of which has a heater H, is controlled so that it coincides with the wavelength of the received light.

Then, the oscillation wavelength of the laser 21S, for providing transmitted light, is controlled so that it coincides with the passband of the filter 15S, through the feedback loop having the filter 15S, the optical-electrical converter 23a, the comparator 24 which receives the threshold level for comparison, and the bottom control circuit 26. The operation of the feedback loop has been described in accordance with FIG. 4C. It should be appreciated of course that the feedback loop for controlling the oscillation wavelength of the laser 21S is not limited to that of FIG. 4C, but another circuit of FIG. 3, FIG. 4A or FIG. 4B is possible.

In a practical embodiment, it is preferable that the time constant in the feedback loop for controlling the passband of the filter 15S, including the heater H, and the thermal control circuit 101, is shorter than the time constant in the feedback loop for controlling the oscillation wavelength of the laser 21, including the comparator 24 and the bottom control 26.

Next, the period of the passband (FSR) of a filter, and the period of longitudinal modes of a laser are discussed.

It is well known that there are two kinds of lasers, a multi-longitudinal mode oscillation laser (for instance a Fabry-Perot laser), and a single-longitudinal mode oscillation laser (distributed feedback laser, or distributed Bragg Reflection laser).

A multi-longitudinal mode oscillation laser satisfies the following equation.

$$q \times (\lambda)/(2n) = L$$

where ($\lambda$) is the oscillation wavelength in a vacuum,
L is the length of a resonator of a laser,
n is the refractive index of the medium,
q is the number of standing waves of half wavelength in the resonator.

As L is much larger than wavelength ($\lambda$), many waves having different wavelengths from each other are generated in the laser, and the oscillation wavelength of the laser is determined so that the gain is the maximum in the many waves. For instance, a laser of 1.3 μm has the period of longitudinal modes of 0.8 nm (determined by n and L in the above equation).

Therefore, it is preferable that the period (=2×FSR) of the passbands of a filter coincides with the period of the longitudinal modes of a laser so that the output power of the laser is transmitted to a receiver with high efficiency, and even when transmitted light of a laser is reflected by a connector at an end of an optical cable, it would be prevented by the filter with no affection of side modes of a signal light, so that the deterioration of an optical receiver due to reflected back light is solved.

When a laser is a single-longitudinal mode oscillation laser, no consideration about the periods is necessary.

Figure 7:
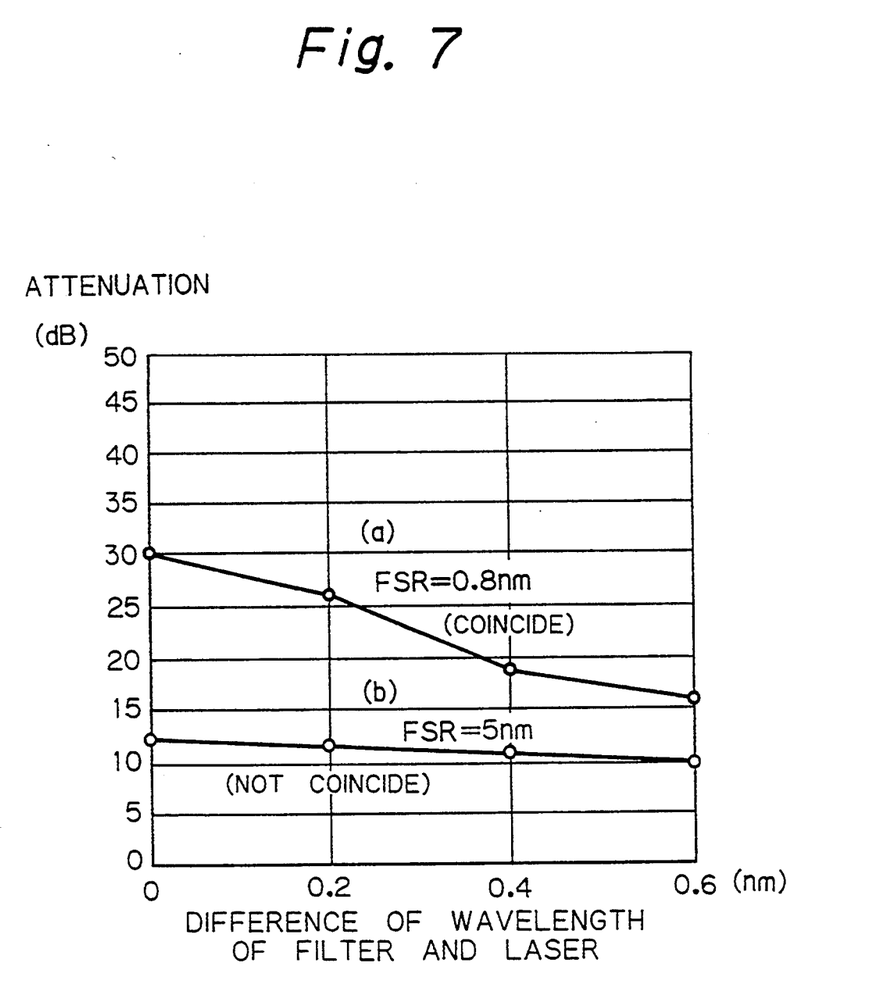
FIG. 7 shows experimental curves showing relations between the period of passbands or attenuation bands of the two beam interference type filter, and the period of oscillation wavelengths of the laser according to the present invention.

FIG. 7 shows experimental curves of side modes in back light where the horizontal axis shows a difference of the center wavelength of the passband of a filter, and the center oscillation wavelength of a laser in nm, and the vertical axis shows attenuation (dB) in back light through the filter as compared with the front light.

The curve (a) in FIG. 7 shows the case that the period of the passbands of a filter coincides with the period of the longitudinal modes of a laser, and FSR=0.8 nm. It should be appreciated in the curve (a) that the attenuation of back light is 30 dB when the center wavelength of the passband of the filter coincides with the center oscillation wavelength of the laser, and the attenuation is 16 dB when the difference of wavelengths is 0.6 nm.

On the other hand, the curve (b) shows the case that the period of the filter does not coincide with the period of the laser, where FSR=5 nm. In that case, the attenuation of back light is around 10–12 dB for each difference of the wavelengths of the laser and the filter.

The requested value of attenuation of back light as compared with the desired front light is generally 12 dB. Therefore, the curve (a) in which the period of the passband of a filter coincides with the longitudinal modes of a filter is satisfactory in practice.

From the foregoing it will not be apparent that a new and improved wavelength division multiplex bothway optical communication system has been found. It should be understood of course that the embodiments discloses are merely illustrative and are not intended to limit the scope of the invention. Reference should be made therefore to the appended claims rather than the specification as indicating the scope of the invention.

What is claimed is:

1. A wavelength division multiplex bothway optical communication system comprising:
    an optical communication cable;
    a first terminal station; and
    a second terminal station coupled with said first terminal station through said optical communication cable,
    each first and second terminal station including
        a) a transmitter having a laser for converting a transmission electrical signal to an optical signal,
        b) an optical receiver for receiving said optical signal which is subject to conversion to said electrical signal, and
        c) a two-beam interference type first filter having a zero phase input port and a pi phase input port coupled with an output of said laser and an input of said optical receiver, respectively, said first filter having periodical characteristics of passband and attenuation band for wavelengths in a communication wavelength band,
        d) a zero phase output port and a pi phase output port with one port being coupled with said optical communication line and the other port being free standing, and said optical communication cable being coupled with the zero phase output port of one terminal station and the pi phase output port of the other terminal station,
        e) wavelength control means for controlling an oscillation wavelength of said laser so that said oscillation wavelength coincides with a center of a passband of said first filter, said wavelength control means including
            1) monitor means for monitoring a wavelength of an output of the laser,
            2) a comparator for comparing a strength of an output of said monitor means with a predetermined threshold level to provide an output, and
            3) control means for adjusting said oscillation wavelength of the laser based upon the output of said comparator so that said oscillation wavelength coincides with the passband of said first filter,
    wherein a wavelength band of the laser in the first terminal station being essentially a same as the wavelength of the laser in the second terminal station in said communication wavelength band.

2. A wavelength division multiplex bothway optical communication system according to claim 1, wherein said monitor means includes a) a two-beam interference type second filter having similar characteristics to that of the first filter, said second filter for receiving back light of the laser at the same phase input port as that of the first filter, and b) a sensor for converting an optical signal of said back light through said second filter to an electrical signal, and said wavelength control means adjusts the oscillation wavelength of the laser so that output of said second filter is maximum.

3. A wavelength division multiplex bothway optical communication system according to claim 1, wherein said monitor means includes a) a two-beam interference type second filter having similar characteristics to that of the first filter, said second filter for receiving back light of the laser at the other phase input port as that of the first filter, and b) a sensor for converting an optical signal of said back light through said second filter to an electrical signal, and said wavelength control means adjusts the oscillation wavelength of the laser so that output of said second filter is minimum.

4. A wavelength division multiplex bothway optical communication system according to claim 1, wherein said two-beam interference type first filter is a Mach-Zehnder type asymmetrical interferometer having a) a pair of directional couplers coupled with each other through a pair of optical waveguides having different lengths from each other, and b) tuning wavelength control means for controlling an optical tuning wavelength of the passband of the first filter by adjusting a temperature of at least a part of one of said pair of optical fibers.

5. A wavelength division multiplex bothway optical communication system according to claim 4, wherein
    the first filter in the first terminal station operates as a standard of a wavelength for communication,
    the wavelength of the laser in the first terminal station is controlled so that the oscillation wavelength of the laser coincides with the passband of said first filter,
    the first filter in the second terminal station is controlled so that received light from the first terminal station is a maximum by adjusting a temperature of one of the optical fibers coupling the directional couplers, and
    the oscillation wavelength of the laser in the second terminal station is controlled so that it conincides with the passband of the first filter in the second terminal station.

6. A wavelength division multiplex bothway optical communication system according to claim 1, wherein said monitor means has a) a directional coupler inserted in said first filter and the optical communication cable to branch a part of the output of the laser, b) a sensor for converting the optical signal of an output of said directional coupler to an electrical signal, c) a comparator for comparing an output of said sensor with a predetermined threshold level, and d) control means for controlling an oscillation wavelength of said laser so that the output of said sensor is a maximum.

7. A wavelength division multiplex bothway optical communication system according to claim 1, wherein said monitor means has a) a sensor for receiving optical light at a free standing output port, which is not coupled with the optical communication cable, of the first filter to convert said optical light to an electrical signal, b) a comparator for comparing an output of said sensor with a predetermined threshold level, and c) control means for controlling an oscillation wavelength of the laser so that light at said free standing port of the first filter is a minimum.

8. A wavelength division multiplex bothway optical communication system according to claim 1, wherein said laser is a multi-mode longitudinal mode type laser and a period of a longitudinal mode of the laser coincides with a period of the passband of said filter.

9. A wavelength division multiplex bothway optical communication system according to claim 1, wherein said communication band is 1.3 μm.

10. A wavelength division multiplex bothway optical communication system according to claim 1, wherein said communication band is 1.5 μm.

* * * * *